United States Patent Office 3,757,006
Patented Sept. 4, 1973

---

3,757,006
PROCESS FOR THE PRODUCTION OF 5-PHENYL-1,4-BENZODIAZEPINES
Poul Nedenskov, Birkerod, Denmark, assignor to Aktieselskabet Grindstedvaerket, Arhus, Denmark
No Drawing. Continuation-in-part of application Ser. No. 553,613, May 31, 1966. This application Dec. 4, 1969, Ser. No. 882,331
Claims priority, application Great Britain, June 9, 1965, 24,418/65
Int. Cl. C07d 53/06
U.S. Cl. 260—239 BD     9 Claims

ABSTRACT OF THE DISCLOSURE

A process for the production of certain 1,4-benzodiazepines by reacting the appropriate Grignard reagent with the corresponding benzodiazepine in solution in pyridine and thereafter converting the compound resulting from the Grignard reaction to the desired compound, the Grignard reaction generally introducing a phenyl group into the 5-position.

---

This application is a continuation-in-part of Ser. No. 553,613, filed May 31, 1966 and now abandoned.

This invention relates to a process for preparing 5-phenyl-1,4-benzodiazepines of the general formula:

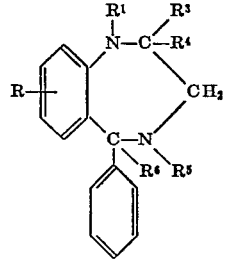

wherein R is hydrogen, halogen, lower alkyl, or trifluoromethyl; $R^1$ is hydrogen or lower alkyl, or $R^1$ and $R^3$ together form a further bond between the nitrogen and carbon atoms to which they are linked, in which latter case $R^4$ is an $NHR^2$ group, wherein $R^2$ is hydrogen or lower alkyl; $R^3$ can further be hydrogen or, together with $R^4$, oxygen, $R^5$ is hydroxyl, and $R^6$ is hydrogen, or $R^6$ represents a further bond to the adjacent nitrogen atoms, in which case $R^5$ either forms part of such bonding or represents the oxygen atom of the N-oxides of said compounds.

By lower alkyl is meant alkyl groups having up to 8 carbon atoms.

The said compounds, and particularly the two compounds:

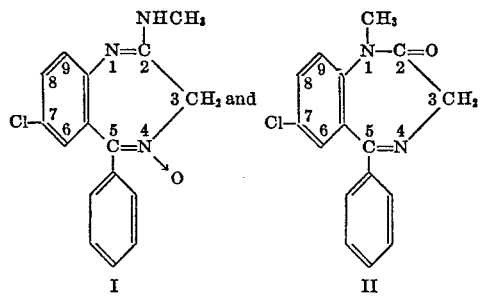

have been reported to have a powerful sedative effect without side effects on being administered orally or parenterally.

In all known methods of producing the said compounds, the starting materials are o-aminobenzophenones, and the diazepine ring is built up either directly or by ring enlargement of a 6-membered ring, containing the two nitrogen atoms.

The said starting materials being rather costly, and often not easily available, it is the main object of the present invention to provide a method starting from cheaper and readily available compounds, and resulting in high yields of the desired products.

The present method is based upon the discovery that it has proved possible to introduce the phenyl group in the 5-position of benzodiazepines after the 7-membered ring has been established, so that cheap and easily available benzaldehyde derivatives can be used as starting materials, according to the following scheme of reactions, starting for example, from 3-chloro-5-nitro-benzaldehyde (III):

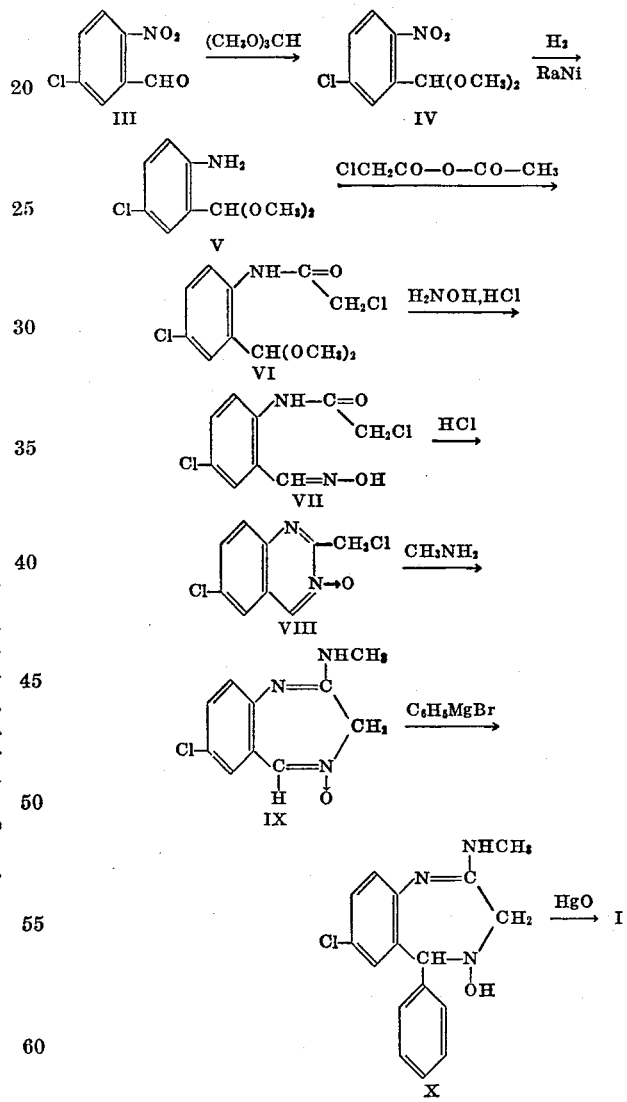

A ring closure of Compound VII can also be effected under alkaline conditions, the scheme of that reaction being as follows:

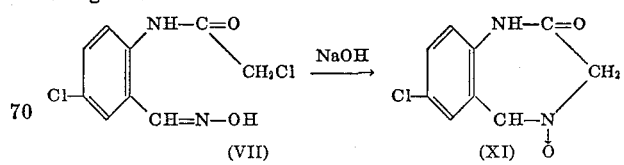

Introducing the methyl group in the 1-position by means, for example, of dimethyl sulphate, and the phenyl group in the 5-position by a Grignard reaction, and splitting off one molecule of water then yields Compound II.

According to Kharasch et al. "Grignard Reactions of Nonmetallic Compounds" (New York 1954), pages 1204 and 1234–1235, Grignard reagents add to the grouping

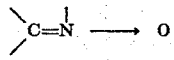

to give compounds having the grouping

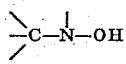

However, the present starting materials being subjected to a Grignard reaction contain two or several groupings, to which the Grignard reagent may be added. For example, the Compound IX above contains in addition to the above mentioned grouping also a grouping —N=C< and a secondary amino group, and the Compound XI above contains a carbonyl group, all of which linkages are vulnerable to attack by the Grignard reagent.

This probably explains why only small to moderate yields of the desired derivative are obtained in the Grignard reaction, the resulting product being a mixture of different compounds.

I have found, however, that if, according to this invention, the Grignard reaction is carried out in solution in pyridine using a phenylmagnesium halide as the Grignard reagent, the phenyl substitution occurs predominantly in the 5-position in the 1,4-benzodiazepines used as starting materials in the present method.

On hydrolyzing the desired compounds, having a hydroxyl group in the 4-position and a phenyl group in the 5-position, are thus won in relatively high yields.

On oxidizing, the corresponding N-oxide is formed, and a dehydration results in removal of the 4-hydroxyl group and formation of a 4,5-double bond.

The following non-limiting examples are illustrative of the present method.

EXAMPLE 1

3-chloro-6-nitrobenzaldehyde dimethyl acetal (IV)

6.0 g. of 3-chloro-6-nitrobenzaldehyde (III) (0.032 mole), 3.9 g. of 98% orthoformic acid trimethyl ester (0.036 mole), 0.08 g. of ammonium chloride, and 4 ml. of methanol were mixed and refluxed for 90 minutes. The reaction mixture was filtered and evaporated to dryness in vacuo. Ether was added to the oily residue, and a precipitate was removed by filtration. The filtrate was evaporated to dryness, and the oily residue was distilled, yielding 6.85 g. of IV (92%), as a slightly yellow oil, $n_D^{25}$ 1.5356, B.P.$_{0.1}$ 86° C.

Calculated for $C_9H_{10}ClNO_4$ (231.6) (percent): C, 46.6; H, 4.4; Cl, 15.3; N, 6.1. Found (percent): C, 46.9; H, 4.5; Cl, 15.4; N, 6.0.

4′-chloro-6′-formyl-2-chloroacetanilide oxime (VIII)

12.18 g. of IV (0.0525 mole) and 300 mg. of potassium acetate were dissolved in 150 ml. of methanol, and the solution was shaken for 5 hours with 5.0 g. of Raney nickel under 4 atmospheres hydrogen pressure at room temperature. After filtering, the filtrate was evaporated in vacuo at 60° C. until dryness, and 150 ml. of ether were added to the oily residue. A white precipitate was removed by filtration, and the yellow filtrate was dried with magnesium sulphate and evaporated in vacuo to dryness, leaving 10.6 g. of a reddish-yellow oily residue (V). This residue was dissolved in 10 ml. of freshly distilled, dry trichloroethylene. A solution of the mixed anhydride of acetic acid and chloroacetic acid was prepared from 5.25 g. of sodium acetate (0.064 mole), 4.95 ml. of chloroacetyl chloride (0.064 mole) and 100 ml. of trichloroethylene by stirring the mixture for 90 minutes at room temperature, and this solution was added in one portion to the solution of V.

The reaction mixture was stirred overnight at room temperature and filtered, the filtrate being evaporated in vacuo to dryness.

The yellow, turbid, oily residue was dissolved in 100 ml. of ether, and the solution was washed with two 15-ml. portions of 6% sodium hydrogen carbonate solution, and dried with magnesium sulphate. The ether was distilled off in vacuo, yielding 14.55 g. of a slightly yellow oil (VI), which were dissolved in 150 ml. of methanol, and the solution was heated to boiling.

A solution of 7.0 g. of hydroxylamine hydrochloride (.1 mole) in 40 ml. of water was added in one portion, and the stirred mixture was heated to boiling, white crystals beginning to precipitate. After 5 minutes, 30 ml. of water were added, and the mixture was gradually cooled to —20° C. during 30 minutes. The crystalline precipitate was isolated, washed with 5 ml. of methanol and two 30-ml. portions of water, and dried, yielding 9.05 g. of VII as white crystals with M.P. 199–202° C. (dec.). Recrystallization from benzene-ethyl acetate (1:2) increased the melting point to 202–203° C. (dec.).

Calculated for $C_9H_8Cl_2N_2O_2$ (247.1) (percent): C, 43.8; H, 3.3; Cl, 28.7; N, 11.0. Found (percent): C, 44.0; H, 3.5; Cl, 28.7; N, 11.0.

7-chloro-1,3-dihydro-2H-1,4-benzodiazepin-2-one-4-oxide (XI)

4.03 g. (0.0163 mole) of VII were stirred for 15 hours under nitrogen at room temperature with 30 ml. of methanol and 16.3 ml. of 1 N sodium hydroxide solution, after which pH was adjusted to 4.5 with dilute hydrochloric acid. 50 ml. of water were added, and the crystalline precipitate was filtered off. After washing with three 100 ml. portions of water, the crystal cake was dissolved by boiling with 300 ml. of a 3:5 mixture of ethanol and water, and the hot solution was filtered. The filtrate was cooled to 0° C., and the precipitate fine white crystal needles were filtered off, washed with two 50 ml. portions of ether, and dried, yielding 2.79 g. of XI as white crystals decomposing at 235° C.

Calculated for $C_9H_7ClN_2O_2$ (210.6) (percent): C, 51.3; H, 3.4; Cl, 16.8; N, 13.3. Found (percent): C, 50.9; H, 3.5; Cl, 16.6; N, 13.1.

7-chloro-1,3-dihydro-1-methyl-2H-1,4-benzodiazepin-2-one-4-oxide 1.11 g. (0.00525 mole) of XI were suspended in 30 ml. of methanol, and the suspension was heated to 60° C. with stirring. A solution of sodium methoxide, prepared from 0.121 g. (0.00525 mole) of sodium and 40 ml. of methanol, was added in one portion. The resulting clear solution was heated to boiling, and 0.50 ml. (0.0055 mole) of freshly distilled methyl sulphate was added in one portion. The mixture was refluxed for one hour, and concentrated to 3–4 ml. on a water bath at 60° C. under reduced pressure. Then 20 ml. of ether and 30 ml. of petrol (B.P. 40–60° C.) were added, and the mixture was cooled to —20° C. A precipitate of a light reddish powder was filtered off, washed with one 10-ml. portion and two 5-ml. portions of water and dried. After recrystallisation from a mixture of ethanol and ether 0.65 g. of the above substance melting at 175–176° C. were recovered.

Calculated for $C_{10}H_9ClN_2O_2$ (224.6) (percent): C: 53.5; H: 4.0; Cl: 15.8; N: 12.5. Found (percent): C: 52.9; H: 4.0; Cl: 15.8; N: 12.5.

7-chloro-1,3,4,5-tetrahydro-1-methyl-4-hydroxy-5-phenyl-2H-1,4-benzodiazepin-2-one 7.88 g. (0.035 mole) of the compound of the preceding step were dissolved in 100 ml. of dry pyridine. 35 ml.

(0.048 mole) of a 1.37 molar solution of phenyl magnesium bromide in ether were added dropwise with stirring during 40 minutes at 15° C. The resulting brickred suspension was stirred for 15 hours at room temperature. It was then cooled to 0° C., and a mixture of 200 g. of crushed ice and 100 ml. of concentrated hydrochloric acid was added with stirring and continued cooling at a temperature below −5° C. Then 200 ml. of ether were added, and the temperature of the mixture was allowed to rise to 20° C. with continued stirring, after which a filtration was made. The greyish brown filter cake was first washed with 40 ml. of water, and then with three 40 ml. portions of ether. The etheral extracts were united, washed with 35 ml. of a 6% aqueous solution of sodium bicarbonate, and dried over anhydrous magnesium sulphate. The ether was evaporated at reduced pressure, and the residue, weighing 9.8 g. was stirred with 100 ml. of petrol (B.P. 40–60° C.) at 40° C. The resulting suspension of crystals was filtered, and the crystals were washed with three 20 ml. portions of pertol (B.P. 40–60° C.) and dried at 80° C., yielding 7.2 g. of a brownish powder which, when recrystallised from benzene, yielded 2.68 g. of the above compound with M.P. 208° C. further recrystallisation from a 2:3 mixture of benzene and petrol (B.P. 40–60° C.) increased the M.P. to 209° C.

Calculated for $C_{16}H_{15}ClN_2O_2$ (302.7) (percent): C: 63.5; H: 5.0; N: 9.3. Found (percent): C: 63.7; H: 5.0; N: 8.9.

EXAMPLE 2

7-chloro-1,3-dihydro-1-methyl-5-phenyl-2H-1,4-benzodiazepin-2-one (II)

1.00 g. (0.0033 mole) of the compound produced according to the final step of Example I was dissolved in 10 ml. of dry pyridine at 20° C. Freshly distilled isocyanic acid phenyl ester (0.72 ml. 0.0066 mole) was added in one portion with stirring. The clear colorless solution was heated to 95° C. over a period of 25 minutes and kept at this temperature until evolution of carbon dioxide stopped. The clear light-yellow solution was evaporated to dryness under reduced pressure from a water bath (65–90° C.). The yellow, semi-crystalline residue was heated under reflux for 15 minutes with 5 ml. of methylene chloride, and the suspension was cooled to 0° C. and filtered. The white crystals were washed with three 1 ml. portions of cold methylene chloride and dried to give 6.9 g. of carbanilide. The filtrate and the washings were evaporated to dryness under reduced pressure from a water bath at 60° C., and the yellow voluminous residue was dissolved in 2 ml. of boiling methanol. The clear solution was cooled, and the vessel was scratched with a glass spatula and left for 30 minutes at −20° C. The resulting crystals were filtered off, washed with three 0.2-ml. portions of cold methanol, and dried (100° C., 10 mm. Hg) to give 0.715 g. of II (76%) as white crystals with M.P. 128–130° C.

EXAMPLE 3

7-chloro-1,3-dihydro-1-methyl-5-phenyl-2H-1,4-benzodiazepin-2-one-4-oxide 3 g. (0.015 mole) of the Compound II were dissolved in 125 ml. of methylene chloride. 2.55 g. (0.126 mole) of 85% m-chloro-peroxybenzoic acid were added, and the suspension was left in the dark at room temperature for 3 days with stirring, during which time the content of active oxygen totally disappeared. The produced m-chlorobenzoic acid was removed by shaking with three portions of respectively 20 ml., 10 ml., and 10 ml. of 6% aqueous sodium bicarbonate solution, after which the limpid organic phase was dried over anhydrous magnesium sulphate. The dry methylene chloride solution was concentrated to 10 ml. at 40° C. and reduced pressure. After addition of 10 ml. of ether and 10 ml. of petrol (B.P. 40–60° C.) 2.5 g of white crystals were precipitated. Recrystallization from 10 ml. of acetone yielded 1.0 g. of the desired compound with M.P. 179–180° C. Addition of water to the filtrate from the recrystallization yielded furthre 0.9 g. more impure substance with M.P. 175–180° C.

EXAMPLE 4

7-chloro-2-methylamino-4-hydroxy-5-phenyl-4,5-dihydro-3H-1,4-benzodiazepine (X)

5.6 g. of IX (0.025 mole) were dissolved in 120 ml. of dry pyridine at 100° C., and the solution was cooled to 10° C to give a fine suspension. 25 ml. of a 2.7 M solution of phenyl magnesium bromide in ether (0.0675 mole) were added dropwise with stirring at 10–15° C. during 30 minutes. The resulting light orange suspension was kept at room temperature for 18 hours with stirring. After cooling to 0° C., the suspension was added with stirring to a mixture of 200 g. of crushed ice and 100 ml. of concentrated hydrochloric acid, the temperature being kept below 5° C. The resulting light tea-colored solution was washed with two 100-ml. portions of ether. Then the aqueous phase was adjusted to pH 7.5 at 10° C. by addition of 3 N sodium hydroxide (about 375 ml.). The solution was extracted with ether in four portions combined of 150, 150, 100, and 100 ml., respectively. The combined organic extracts were left overnight at −20° C., and the separated ice was removed by filtration. The filtrate was evaporated to dryness in vacuo from a water bath (80° C.), and the residue, weighing 6.6 g., was crystallized from methylene chloride and from acetone to give 4.5 g. (60%) of X as white crystals melting at 181–183° C.

Calculated for $C_{16}H_{16}ClN_3O$ (percent): C: 63.7; H: 5.3; Cl: 11.8; N: 13.9. Found (percent): C: 63.4; H: 5.3; Cl: 11.7; N: 14.1.

EXAMPLE 5

1.5 g. of X were oxidized with mercuric oxide to yield 0.79 g. of I with M.P. 243° C.

I claim:

1. A process for the production of 1,4-benzodiazepines of the formula

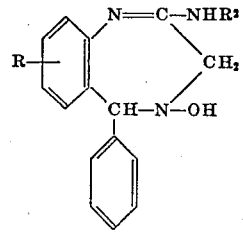

in which R is a member of the group consisting of hydrogen, halogen, lower alkyl groups, and the trifluoromethyl group, and $R^2$ is a member of the group consisting of hydrogen and lower alkyl groups which comprises reacting a benzodiazepine of the formula

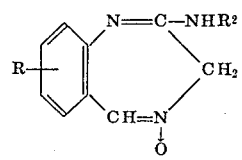

wherein R and $R^2$ are as defined above, in solution in pyridine with a phenylmagnesium halide and hydrolyzing the resulting compound.

2. A process as set forth in claim 1, which comprises oxidizing the resulting compound to a compound of the formula

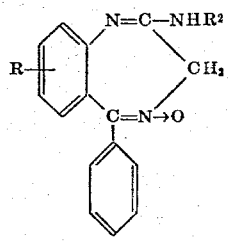

wherein R and R² are the same as in the starting compound.

3. A process as set forth in claim 1, which comprises dehydration of the resulting compound to yield a compound of the formula

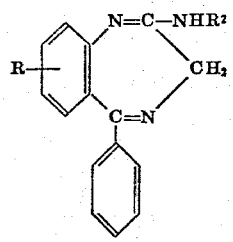

wherein R and R² are as in the starting compound.

4. A process for the production of 1,4-benzodiazepines of the formula

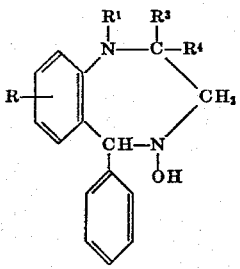

wherein R is a member of the group consisting of hydrogen, halogen, lower alkyl groups, and the trifluoromethyl group, R¹ is a member of the group consisting of hydrogen and lower alkyl, and R³ and R⁴ are each hydrogen or together are oxygen, which comprises treating a benzodiazepine of the formula

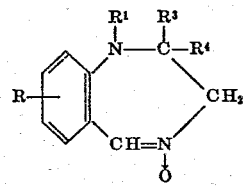

wherein R, R¹, R³ and R⁴ are as defined above, in solution in pyridine with a phenylmagnesium halide and hydrolyzing the resulting compound.

5. A process as set forth in claim 4, which comprises oxidizing the resulting compound to yield a compound of the formula

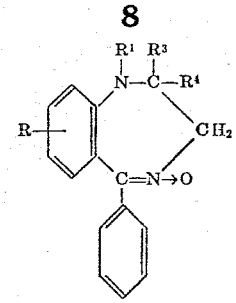

6. A process as set forth in claim 4, which comprises dehydration of the resulting compound to yield a compound of the formula

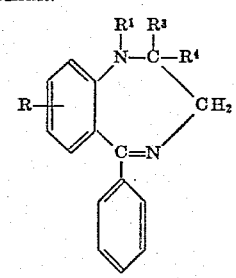

7. A process for the production of 7-chloro-2-methylamino - 5 - phenyl-3H-1,4-benzodiazepine-4-oxide, which comprises performing a ring closure of 4-chloro-6-formyl-2-chloroacetanilide-oxime by means of hydroxylamine to yield 7-chloro-2-chloromethyl-quinazoline-3-oxide, reacting the latter with methylamine to yield 7-chloro-2-methylamino-3H-1,4-benzodiazepine-4-oxide, and finally introducing the 5-phenyl group by reaction in solution in pyridine with a phenylmagnesium halide.

8. A process as set forth in claim 7, which comprises effecting the ring closure by exposing the oxime to strongly acid conditions.

9. A process for the production of 7-chloro-1,3-dihydro - 1 - methyl-5-phenyl-2H-1,4-benzodiazepin-2-one-4-oxide comprising condensing 4-chloro-6-formyl-2-chloroacetanilide oxime with sodium hydroxide to yield 7-chloro-1,3 - dihydro - 2H-1,4-benzodiazepin-2-one-4-oxide, methylating with sodium methoxide, reacting the resulting compound in solution in dry pyridine with phenylmagnesium bromide and hydrolyzing to yield 7-chloro-1,3,4,5-tetrahydro - 1 - methyl-4-hydroxy-5-phenyl-2H-1,4-benzodiazepin-2-one, reacting the latter with phenyl isocyanate to yield 7-chloro-1,3-dihydro-1-methyl-5-phenyl-2H-1,4-benzodiazepin-2-one, and oxidizing the latter compound.

References Cited

UNITED STATES PATENTS

| 3,553,205 | 1/1971 | Nedenskov | 260—239.3 D |
| 3,177,201 | 4/1965 | Reeder et al. | 260—239 |
| 3,120,521 | 2/1964 | Sternbach et al. | 260—239 |
| 3,267,110 | 8/1966 | Pachter et al. | 260—239 |

FOREIGN PATENTS

| 1,482,641 | 4/1967 | France | 260—239 |

OTHER REFERENCES

Kharasch et al., Grignard Reactions of Nonmetallic Compounds (New York, 1954), pp. 49–50, 1204, 1234–1235.

Sternbach et al., J. Org. Chem., vol. 26, pp. 1111–1118 (1961).

ALTON D. ROLLINS, Primary Examiner

U.S. Cl. X.R.

260—239.3 D, 251 Q, 562 B, 575, 599, 611 A